United States Patent [19]

Alas et al.

[11] Patent Number: 4,650,050

[45] Date of Patent: Mar. 17, 1987

[54] STARTING AND COUPLING MEMBER

[75] Inventors: Jacques Alas, Eaubonne; Rumignani Paolo, Neuilly, both of France

[73] Assignee: Valeo, Paris, France

[21] Appl. No.: 611,698

[22] Filed: May 18, 1984

[30] Foreign Application Priority Data

May 24, 1983 [FR] France ............................... 83 08520

[51] Int. Cl.⁴ ...................... F16D 13/72; F16D 13/71
[52] U.S. Cl. ............................... 192/70.12; 192/89 B; 192/115; 74/572
[58] Field of Search ............... 192/70.12, 70.13, 70.27, 192/115, 113 A, 89 B; 74/572; 123/414

[56] References Cited

U.S. PATENT DOCUMENTS

| | | | |
|---|---|---|---|
| 3,128,639 | 4/1964 | Hein et al. | 74/572 |
| 3,583,537 | 6/1971 | Spannagel | 192/70.12 X |
| 4,365,602 | 12/1982 | Stiller et al. | 123/414 |
| 4,493,409 | 1/1985 | Steeg | 192/115 |

FOREIGN PATENT DOCUMENTS

| | | |
|---|---|---|
| 2526102 | 11/1983 | France . |
| 2526106 | 11/1983 | France . |
| 1090622 | 11/1967 | United Kingdom . |
| 1361649 | 7/1974 | United Kingdom . |
| 1368304 | 9/1974 | United Kingdom . |

*Primary Examiner*—George H. Krizmanich
*Attorney, Agent, or Firm*—Charles E. Brown; Charles A. Brown

[57] ABSTRACT

A clutch in which the starter ring and the ignition-timing target are carried by one and the same annular supporting collar. The reaction plate being formed by two separate components, namely a supporting flange, through which it is designed to be attached to the shaft in question, and an actual reaction plate, with which the friction disk can interact, the supporting flange itself forms directly the annular supporting collar for the starter ring and the ignition-timing target.

7 Claims, 5 Drawing Figures

U.S. Patent  Mar. 17, 1987  Sheet 3 of 3  4,650,050

STARTING AND COUPLING MEMBER

The present invention relates, in general terms, to starting and coupling members, especially for a motor vehicle, of the type comprising substantially an input element intended to be fixed in terms of rotation to a first shaft, in practice a drive shaft, an output element intended to be fixed in terms of rotation to a second shaft, in practice a driven shaft, and means of coupling between the said elements.

For example, a clutch can be concerned here, its input element being the reaction plate or flywheel and its output element being the friction disk.

However, a hydraulic coupling member, such as a torque converter or coupler, can also be concerned here, its input element being the housing, usually solid with a transverse supporting flange for fixing it to the shaft in question, and its output element being the turbine wheel.

Essentially, a clutch will be discussed in the following and for the sake of greater simplicity.

The French patent filed on 29th April 1982 under No. 82/07,393 and published under No. 2,526,106 and from which U.S. No. 489,802, filed Apr. 29, 1983, claims priority, describes a clutch, particularly for a motor vehicle, of the type comprising, in addition to a first plate, called a reaction plate or flywheel, forming its input element and intended to be fixed in terms of rotation to a first shaft, in practice a drive shaft, and a friction disk forming its output element and intended to be fixed in terms of rotation to a second shaft, in practice a driven shaft, a second plate, called a pressure plate, solid in terms of rotation with the reaction plate, whilst being movable axially in relation to the latter, a component, called a cover, fixed to at least part of the reaction plate, and elastic means which, bearing on the cover, are designed to urge the pressure plate towards the reaction plate, and, according to the invention proposed in this French patent, with a starter ring and an ignition-timing target carried by one and the same annular supporting collar.

Such an arrangement advantageously results in, in particular, simpler production.

In the embodiment described more particularly in the French patent in question, as has been most frequent hitherto, the reaction plate is in one piece.

However, there has also been a proposal to make this reaction plate in two separate parts solid with one another in terms of rotation, namely a transverse supporting flange, by means of which it can be fixed to the shaft in question, and an actual reaction plate, with which the friction disk can interact.

The advantage of such an arrangement, which is described, for example, in the French patent filed on 29th April 1982 under No. 82/07,391 published under No. 2,526,102 and from which U.S. Ser. No. 489,531, filed Apr. 29, 1983, claims priority, is, in particular, that it makes it possible to match the two parts both constituting the reaction plate as closely as possible to the functions which they have to perform.

The object of the present invention is, in general terms, to make additional use of this arrangement, in combination with that which is the subject of French Patent No. 82/07,393, (sic) with possible use not only in clutches, but also in any other type of starting and coupling member.

More specifically, its subject is, therefore, a starting and coupling member of the type comprising an input element, intended to be fixed in terms of rotation to a first shaft, in practice a drive shaft, and an output element intended to be fixed in terms of rotation to a second shaft, in practice a driven shaft, with a starter ring and an ignition-timing target carried by one and the same annular supporting collar, this starting and coupling member being defined, in general terms, in that, with the input element incorporating a transverse supporting flange by means of which it can be fixed to the shaft in question, the said supporting flange itself directly forms the supporting collar for the starter ring and the ignition-timing target.

In addition to making production even simpler, since one and the same component, namely the supporting flange, itself carries not only the starter ring and the ignition-timing target, but also all the components to be attached to such a supporting flange to form the starting and coupling member in question, the arrangement according to the invention is also, if desired, capable of promoting a more precise use of the ignition-timing target and therefore more accurate working conditions for the sensors associated with it.

In fact, according to a preferred embodiment, the ignition-timing target is in one piece with the supporting flange, being formed, for example, by the edge of the peripheral part of the latter.

Consequently, there is only one connection between the ignition-timing target and the shaft in question, namely, that by means of which the supporting flange forming this ignition-timing target is attached to this shaft, so that, since on the contrary no connection is made between the ignition target and the supporting flange, the conditions of strict centering between this ignition-timing target and the shaft in question can be satisfied more easily.

Moreover, the characteristics and advantages of the invention will emerge from the following description given by way of example, with reference to the attached diagrammatic drawings in which:

FIGS. 1 to 4 illustrate by way of example the use of the invention in a clutch for a motor vehicle.

Figure 2:
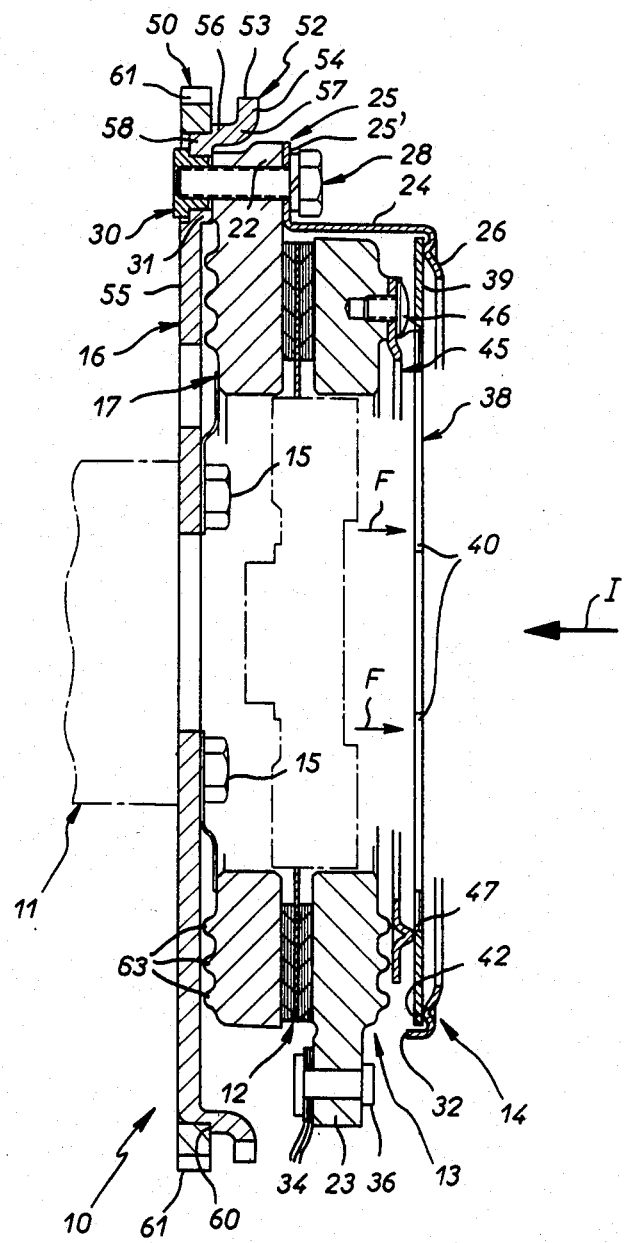
FIG. 2 is a view of this in axial section, along the broken line II—II in FIG. 1.

Altogether, and as illustrated in these figures, such a clutch at least comprises, in a way known per se, a first plate 10, commonly called a reaction plate or flywheel, forming its input element and intended to be fixed in terms of rotation to a first shaft 11, indicated by dot-and-dash lines, for example, in FIG. 2, a friction disk 12 forming its output element and intended to be fixed in terms of rotation to a second shaft, not shown in the figures, a second plate 13, called a pressure plate, solid in terms of rotation with the reaction plate 10, whilst being movable axially in relation to the latter, a component 14, called a cover, fixed by fastening means to at least part of the reaction plate 10 and therefore connected axially to the latter, and elastic means which, bearing on the cover 14, are designed to stress the pressure plate 13 towards the reaction plate 10 so as to clamp the friction disk 12 axially between the said pressure plate 13 and the said reaction plate 10.

In practice, the shaft 11 is a drive shaft.

Since a clutch for a motor vehicle is concerned, this shaft is the shaft of the engine of such a vehicle, or crankshaft.

In a way likewise known per se, the reaction plate 10 is formed by two separate parts fixed to one another by fastening means in the embodiment illustrated, namely, on the one hand, a transverse supporting flange 16, by which it can be fixed, by fastening means, to the shaft 11 in question, and, on the other hand, an actual reaction plate or reaction member 17, having a transverse face with which the friction disk 12 can interact.

In the embodiments illustrated, the fastening means fixing the supporting flange 16 to the shaft 11 consist of a plurality of screws 15 suitably distributed circularly round the axis of the assembly.

The actual reaction plate 17 is a component of annular overall form, which has lugs 22 projecting radially in places on its outer periphery, for fastening it to the supporting flange 16.

In the embodiments illustrated, there are three of these lugs 22, and they are uniformly distributed circularly round the axis of the assembly.

In the figures, and with the exception of its friction linings, the friction disk 12 has merely been indicated diagrammatically by its contour in the form of thin lines.

Such a friction disk is well-known per se, and since it does not form as such part of the present invention, it will not be described in any more detail here.

Like the actual reaction plate 17, the pressure plate 13 is a component of annular overall form, which has lugs 23 projecting radially in places on its outer periphery, for connecting it to the actual reaction plate 17.

In the embodiments illustrated, there are three of these lugs 23, and they are uniformly distributed circularly round the axis of the assembly.

The cover 14 too is, in a way known per se, a component with an overall annular configuration.

In the embodiments illustrated, it possesses, at the axial ends of a side wall 24, of overall cylindrical or frustoconical form, on the one hand, directed radially outwards, a radial rim 25, by which, according to procedures described in more detail below, it is secured to the reaction plate 10, and, on the other hand, directed radially inwards, a flange 26, by which it offers support to the elastic means, also described in detail below, which are intended to stress the pressure plate 13 towards the said reaction plate 10.

In the embodiments illustrated, the radial rim 25 of the cover 14 formed in this way is divided circularly overall into a plurality of separate portions 25', of which there are three in these embodiments and which are uniformly distributed circularly round the axis of the assembly.

Furthermore, via the portions 25' of its rim 25, the cover 14 is laid against the lugs 22 of the actual reaction plate 17, the said portions 25' each being substantially superimposed on the said lugs 22, respectively.

For each assembly consisting in this way of a lug 22 of the actual reaction plate 17 and a portion 25' of the rim 25 of the cover 14, one and the same screw 28 passing axially through such an assembly secures the latter to the supporting flange 16.

Thus, in these embodiments, the fastening means which ensure that the cover 14 is fixed to at least part of the reaction plate 10, in this particular case the screws 28, affect the whole of the reaction plate, and they also themselves constitute the fastening means which ensure that the two parts forming this reaction plate 10, namely the actual reaction plate 17 and the supporting flange 16, are fixed to one another.

Figure 1:
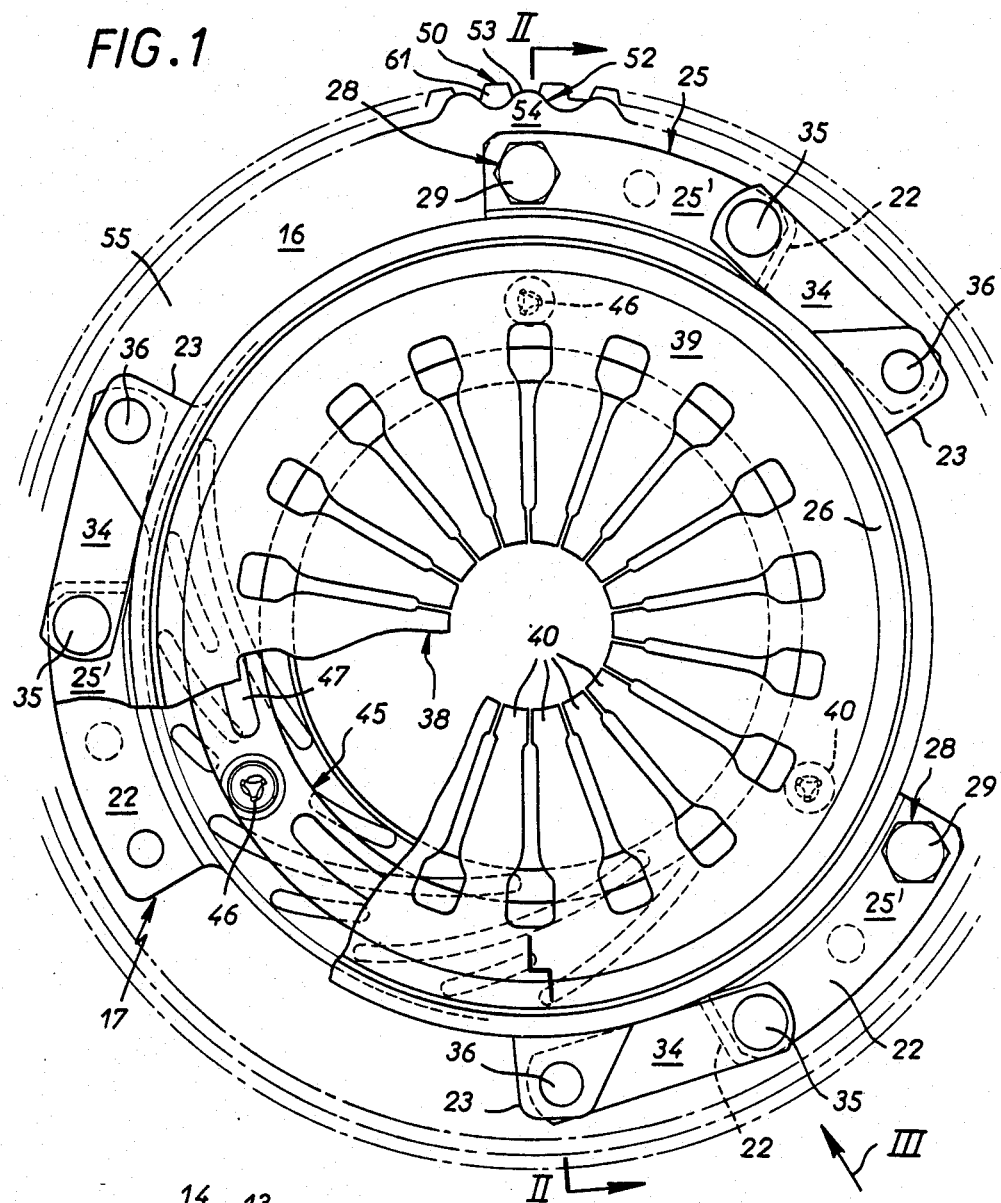
FIG. 1 is a partial plan view, with a local cutaway, of a starting and coupling member according to the invention, according to the arrow I in FIG. 2.
Figure 3:
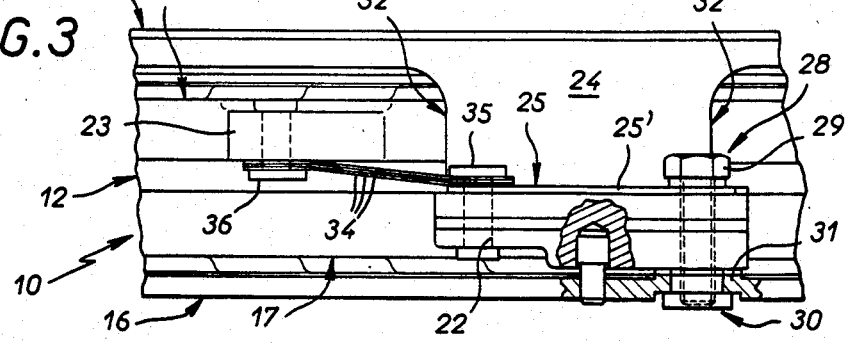
FIG. 3 is a partial side view of this, with a local cutaway, according to the arrow III of FIG. 1.

In the embodiments illustrated, the head 29 of the screws 28 is located on the same side as the cover 14, and the shank of each of these screws 28 interacts by screwing with a nut 30 which is attached, for example by welding, to the supporting flange 16 on the face of the latter opposite the cover 14, such a nut being, for example, inserted in the said supporting flange 16 by means of a local depression 31 in the latter, as illustrated in FIGS. 1 to 3.

At all events, all the components of the clutch in question are attached to the shaft 11 in question by means of the supporting flange 16, the said assembly then constituting, in this way, what is commonly called a mechanism for the clutch concerned.

From one of the portions 25' of the rim 25 to the other, the side wall 24 of the cover 14 is substantially cut away over a major part of its axial length and, in practice, as illustrated, over virtually the whole of the latter, by means of notches 32.

Whilst assisting the ventilation of the inner volume of the clutch, these notches 32 allow passage for the lugs 23 of the pressure plate 13.

The lugs 23 of the pressure plate 13 are offset circumferentially relative to the lugs 22 of the actual reaction plate 17 and are each connected respectively to the latter by means of elastically deformable tabs 34.

These elastically deformable tabs 34, which are superimposed in groups of three or four in the embodiments illustrated, extend tangentially overall to a circumference of the assembly, and at one of their ends they are attached to the lugs 22 of the actual reaction plate 17 by a rivet 35, and at their other end they are attached to the lugs 23 of the pressure plate 13 by a rivet 36.

In a way known per se, these elastically deformable tabs 34 ensure that the pressure plate 13 is fixed in terms of rotation to the reaction plate 10, whilst allowing the former to execute an axial movement in relation to the latter.

In the embodiments illustrated, the elastic means designed to stress the pressure plate 13 in the direction of the reaction plate 10 consist, in a way known per se, of a component of overall annular configuration called a diaphragm and identified by the reference numeral 38, which has a peripheral part forming a Belleville washer 39 and a central part fragmented into radial fingers 40.

Via its peripheral part forming Belleville washer 39, the diaphragm 38 bears on the cover 14 and, more specifically, on the radial flange 26 of the latter, by means of an annular boss 42 projecting axially from the said flange for this purpose, this annular boss 42 being formed, in practice, as illustrated, by a local depression in this radial flange 26.

By means of its peripheral part forming a Belleville washer 39, the diaphragm 38 is also designed to act on the pressure plate 13.

In the embodiments illustrated, and in a way known per se, it thus acts on the pressure plate 13 by means of an annular component 45 which, separate from this pressure plate 13, is suitably attached in places to the latter by screws 46 and which has an annular boss 47 projecting axially from it to bear on the diaphragm 38.

In practice, and as illustrated, this annular boss 47 is formed by a local depression in the annular component 45, and it is interrupted locally, in places, for inserting the screws 46 securing the latter to the pressure plate 13.

Via the end of its radial fingers 40, the diaphragm 38 is designed to be subjected to a clutch release bearing, not shown in the figures.

In the embodiments illustrated, this is a clutch release bearing designed to take effect by pulling, that is to say, in the opposite direction to the reaction plate 10, as indicated by arrows F in FIG. 2.

Consequently, the diameter of the circumference, along which extends the annular bead 42 which the cover 14 possesses for bearing on the diaphragm 38, is greater than that of the circumference along which extends the annular bead 47 which the annular component 45 attached to the pressure plate 13 possesses jointly, to ensure the action of this diaphragm 38 on the said pressure plate 13.

Since these arrangements, and others appearing in the figures, do not form part of the present invention, they will not be described in any more detail here.

In a way known per se, there is also a starter ring 50 and an ignition-timing target 52, one and the same annular supporting collar carrying this starter ring 50 and this ignition-timing target 52.

According to the invention, the supporting flange 16 forming one of the parts constituting the reaction plate 10 also itself directly forms the supporting collar for the starter ring 50 and the ignition-timing target 52.

Preferably, and as illustrated, the ignition-timing target 52 is in one piece with the supporting flange 16.

In the embodiments illustrated, it is formed by the edge 53, for example, corrugated or notched for this purpose, as illustrated, of the peripheral part 54 of the supporting flange 16.

In the embodiment illustrated more particularly in FIGS. 1 to 3, this radially projecting peripheral part 54 of the supporting flange 16 is offset axially relative to the running part or central portion 55 of the latter, extending, like this, substantially radially, and between this peripheral part 54 and this running part 55 the supporting flange 16 possesses an axial connecting portion 56 which extends axially overall in the direction of the transverse face of the reaction member 17, being more or less extensive, and which is connected both to the said peripheral part 54 and to the said running part 55 by means of an elbow 57, 58 respectively.

In practice, in this embodiment, the peripheral part 54 of the supporting flange 16 is offset axially in the direction of the actual reaction plate 17, extending radially beyond the outer periphery of this actual reaction plate 17.

Jointly with this, the starter ring 50 forms a component which, separate from the supporting flange 16, extends transversely substantially in the radial prolongation of the running part 55 of the latter.

In the embodiment illustrated, this starter ring 50 is attached to the supporting flange 16 by means of a recess 60 made in line with the elbow 58 by means of which its connecting portion 56 is connected to its running part 55.

The starter ring 50 can simply be force-fitted in the recess 60.

Alternatively, it can be secured there, for example, by welding, if desired.

In a way known per se, it has on its edge a toothing 61, and it can be formed as a result of the rolling of an initially straight bar.

As is easy to understand, the supporting flange 16 can easily be produced by depressing an initially flat blank, jointly with the ignition-timing target 52.

In the embodiment illustrated more particularly in FIGS. 1 to 3, the actual reaction plate 17 has projecting from it, in contact with the supporting flange 16, ribs 63 which provide together with the latter air circulation channels.

Figure 4:
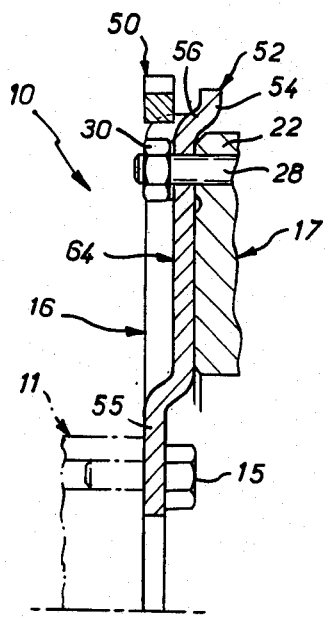
FIG. 4 is a partial view in axial section, similar to that of FIG. 2 and relating to an alternative embodiment.

This is not the case in the alternative embodiment illustrated in FIG. 4.

In this alternative embodiment, the running part 55 of the supporting flange 16 has locally, in places, in contact with the actual reaction plate 17, a plurality of spaced stamped portions offset relative to adjacent portions of the supporting flange 16 defining depressions 64 which extend up to its outer periphery and which define air circulation channels radially outwardly between them, two by two, together with an adjacent portion of the said actual reaction plate or reaction member 17.

The nuts 30 are each individually inserted by means of these depressions 64.

The starter ring 50, which, as before, extends transversely substantially in the radial prolongation of the running part 55 of the supporting flange 16, overhangs locally, in places, the recesses provided by the depressions 64 of the latter.

Otherwise, the arrangements are of the same type as those described above.

Of course, the present invention is not limited to the embodiments described and illustrated, but embraces any alternative form of execution.

In particular, instead of being assembled from the front, on the same side as the cover, the mechanism can equally be assembled on the supporting flange from the rear, in which case, the heads of the corresponding screws occur on the same side as the said supporting flange.

Likewise, instead of being attached to the supporting flange jointly with the actual reaction plate, the cover can be attached directly to this supporting flange independently of the said actual reaction plate.

Moreover, the supporting flange need possess only a single elbow, in axial section, in which case its peripheral part forming the 'ignition-timing target extends substantially axially, and the latter can be obtained by means of perforations, instead of notchings or corrugations.

In all cases, the corresponding sensors can take effect axially or radially.

Furthermore, although, in the embodiment described and illustrated, the actual reaction plate and the supporting flange are solid with one another not only in terms of rotation, that is to say circumferentially, but also axially, this need not necessarily be the case.

Finally, the scope of use of the invention is not limited to circumstances in which the associated clutch release bearing acts by pulling, but also extends to circumstances where this clutch release bearing acts by pushing, that is to say in the direction of the reaction plate.

As a corollary to this, and as indicated above, the scope of use of the invention is not limited solely to that of clutches.

Figure 5:
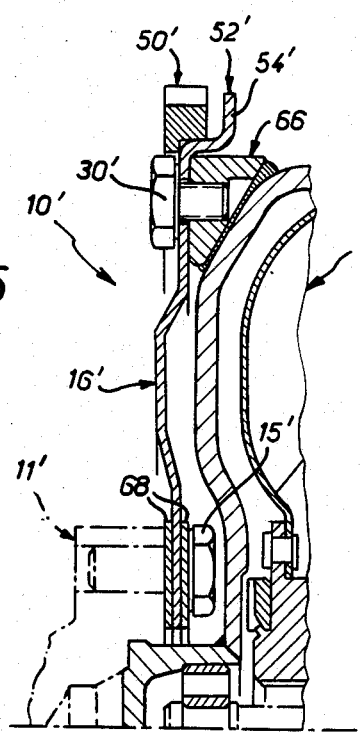
FIG. 5 is likewise a partial view in axial section, similar to that of FIG. 2 and relating to another starting and coupling member according to the invention.

On the contrary, as illustrated in FIG. 5, it extends just as well, for example, to hydraulic coupling members, such as torque converters or couplers.

Since such a hydraulic coupling member is well-known per se and does not as such form part of the present invention, it will not be described in all its details here.

It will be sufficient to indicate that the housing 10' forms its input element, the turbine 12' present this housing 10' forms its output element, and the said housing 10' is attached to a transverse supporting flange 16' so as to fix it to the shaft 11' in question by means of screws 15'.

For example, and as illustrated, the housing 10' carries on the outside, in places, studs 66, by means of which it is fixed to the supporting flange 16' by screws 30'.

In the embodiment illustrated, the supporting flange 16' which is relatively thin is reinforced on its inner periphery, at the level of the screws 15', by means of washers 68.

At all events, and according to the invention, it constitutes itself the supporting collar for a starter ring 50' and an ignition-timing target 52', the latter being formed, as before, and as illustrated, for example by the peripheral part 54' of such a supporting flange 18' which is directed radially and which is offset axially in relation to the running part of the latter.

As indicated above, however, it goes without saying that this ignition-timing target can extend axially and possess perforations circularly and at regular intervals for the purpose of interaction with a radially arranged sensor.

We claim:

1. A starting and coupling member for an automotive clutch or hydraulic coupling, said starting and coupling member comprising a transverse supporting flange having a central portion adapted to be fixed for rotation with a torque transmitting shaft, said flange having an integrally formed axial connecting portion connected to a radially projecting peripheral portion, a separate starting ring fixed at the outer periphery of and in radial alignment with said transverse supporting flange at the junction with said connection portion, and an ignition timing target formed by a free edge portion of said radially projecting peripheral part, said starting ring being axially spaced from said ignition timing target, said ignition timing target being of a one piece construction with said transverse supporting flange.

2. A starting and coupling member according to claim 1, wherein said ignition timing target comprises an edge of said radially projecting peripheral portion.

3. A starting and coupling member according to claim 1, wherein an annular bend is formed at the junction of said transverse supporting flange and said axial connection portion, and an annular notch is formed in said annular bend, said starting ring being partly received in said annular notch.

4. A starting and coupling member according to claim 3, wherein another annular bend is formed at the junction of said axial connecting portion and said radially projecting peripheral portion.

5. A starting and coupling member according to claim 1, wherein said starting and coupling member defines a first part of a two-part clutch reaction plate, a second part of said two-part clutch reaction plate comprising a reaction member separate from said first part, means fixing said second part for rotation with said first part, said second part being arranged radially inwardly of said axial connecting portion of said starting and coupling member, said reaction member having a transverse face adapted to cooperate with a clutch plate, said axial connecting portion extending from said transverse supporting flange in the direction of said transverse face of said reaction member.

6. A starting and coupling member according to claim 5, wherein said supporting flange comprises a plurality of spaced apart stamped portions offset relative to adjacent portions of said supporting flange.

7. A starting and coupling member according to claim 6, wherein said stamped portions open radially outwardly to the periphery of said transverse supporting flange, and adjacent ones of said stamped portions together with an adjacent portion of said reaction member defining channel means for circulating air radially.

* * * * *